US010270720B2

(12) United States Patent
Wang et al.

(10) Patent No.: US 10,270,720 B2
(45) Date of Patent: Apr. 23, 2019

(54) SUGGESTING RELATED ITEMS

(71) Applicant: MICROSOFT TECHNOLOGY LICENSING, LLC, Redmond, WA (US)

(72) Inventors: Hui Wang, Foster City, CA (US); Jeffrey Kalvass, Mountain View, CA (US); Yanling Wang, Belmont, CA (US); Diana Jaffe, Mountain View, CA (US); Misty Pickford, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 386 days.

(21) Appl. No.: 13/722,980

(22) Filed: Dec. 20, 2012

(65) Prior Publication Data
US 2014/0181219 A1 Jun. 26, 2014

(51) Int. Cl.
*G06F 17/24* (2006.01)
*G06F 9/451* (2018.01)
(Continued)

(52) U.S. Cl.
CPC .......... *H04L 51/08* (2013.01); *G06F 3/04895* (2013.01); *G06F 9/453* (2018.02);
(Continued)

(58) Field of Classification Search
CPC ....... G06Q 10/107; H04L 51/28; H04L 51/08; H04L 51/14; H04L 51/16; H04L 51/22; G06F 17/3064
See application file for complete search history.

(56) References Cited

U.S. PATENT DOCUMENTS 6,707,474 B1 * 3/2004 Beck ................ G01R 1/025
702/66
7,487,456 B2 2/2009 Brooke
(Continued)

FOREIGN PATENT DOCUMENTS

CN 101185072 A 5/2008
CN 101889430 A 11/2010
(Continued)

OTHER PUBLICATIONS

International Search Report and Written Opinion for PCT/US2013/076682 dated Sep. 16, 2014.
(Continued)

*Primary Examiner* — Michael A Keller
*Assistant Examiner* — Austin J Moreau
(74) *Attorney, Agent, or Firm* — Merchant & Gould P.C.

(57) ABSTRACT

Recommendations, such as recipients and attachments, are determined from content that is associated with a message item. A user may enter one or more: recipients; attachments; and message content for the message that may be used in determining recommendations. Keywords may also be identified by analyzing the content of the message to determine recommended content/recipients. Behavior patterns may also be used to determine recommendations. The recommended users/content of a message may be obtained from a messaging program, a local data store, a network data store, a cloud service, and the like. The recommended items (e.g. users/content) determined from analyzing the content are displayed such that they may be used by the user when editing the message item. The recommended items may be ranked by relevancy using metrics such as keywords, people, time last viewed and use patterns.

18 Claims, 10 Drawing Sheets

(51) Int. Cl.
*H04L 12/58* (2006.01)
*G06F 3/0489* (2013.01)

(52) U.S. Cl.
CPC ............ *G06F 17/243* (2013.01); *H04L 51/02* (2013.01); *H04L 51/32* (2013.01)

(56) References Cited

U.S. PATENT DOCUMENTS

| | | | |
|---|---|---|---|
| 7,512,654 | B2 | 3/2009 | Tafoya et al. |
| 8,122,095 | B2 | 2/2012 | Kraenzel et al. |
| 8,286,085 | B1* | 10/2012 | Denise ................. G06Q 10/107 707/705 |
| 8,868,566 | B2* | 10/2014 | Yanagihara .......... G06Q 10/107 707/748 |
| 8,995,990 | B2 | 3/2015 | Nurmi |
| 2005/0132336 | A1* | 6/2005 | Gotwals .............. G06F 11/3604 717/127 |
| 2008/0319818 | A1* | 12/2008 | Gurdin .................... G06F 9/451 705/7.24 |
| 2009/0077026 | A1 | 3/2009 | Yanagihara |
| 2009/0144635 | A1 | 6/2009 | Miyazaki et al. |
| 2009/0234876 | A1 | 9/2009 | Schigel et al. |
| 2010/0306185 | A1* | 12/2010 | Smith et al. ................... 707/709 |
| 2011/0093415 | A1 | 4/2011 | Rhee et al. |
| 2011/0106889 | A1* | 5/2011 | Scott ..................... G06Q 10/107 709/206 |
| 2011/0231499 | A1* | 9/2011 | Stovicek ........... H04M 1/72547 709/206 |
| 2012/0110087 | A1* | 5/2012 | Culver ................ G06F 17/5004 709/205 |
| 2012/0150979 | A1 | 6/2012 | Monaco |
| 2012/0278406 | A1 | 11/2012 | Meisels et al. |
| 2012/0317285 | A1* | 12/2012 | Allen ...................... H04L 51/22 709/225 |
| 2013/0117383 | A1* | 5/2013 | Hymel .......................... 709/206 |
| 2013/0185307 | A1* | 7/2013 | El-Yaniv ............. G06F 17/2785 707/748 |
| 2013/0227031 | A1* | 8/2013 | Wells ....................... H04L 51/28 709/206 |
| 2014/0122456 | A1* | 5/2014 | Dies .................. G06F 17/30707 707/706 |
| 2014/0173530 | A1* | 6/2014 | Mesguich Havilio ...................... G06F 3/04883 715/863 |

FOREIGN PATENT DOCUMENTS

| | | |
|---|---|---|
| JP | 2003-36234 A | 2/2003 |
| JP | 2005-70933 A | 3/2005 |
| JP | 2011-186666 A | 9/2011 |
| WO | 2012/162548 A2 | 11/2012 |

OTHER PUBLICATIONS

"Unified Communications WebClient", Retrieved on: Sep. 26, 2012, Available at: http://www.icewarp.com/products/webmail/.

"Suggested Contacts and Auto-Complete Lists", Published on: Mar. 17, 2012, Available at: http://www.slipstick.com/outlook/suggested-contacts-and-auto-complete-lists/.

"Smart Contacts for Microsoft Outlook", Retrieved on: Sep. 26, 2012, Available at: http://www.ablebits.com/outlook-contacts/index.php.

Carvalho, et al., "Email Leaks and Recipient Suggestions a User Study with Mozilla Thunderbird", In Proceedings of the 27th International Conference on Human Factors in Computing Systems, Apr. 9, 2009, 10 pages.

Dandu, et al., "Web Personalization Design and Implementation of a User Assist System for Mail Composition", In the International Journal of Innovation, Management and Technology, vol. 3, No. 1, Feb. 2012, 6 pages.

"Getting Started with Google Apps", Retrieved on: Sep. 26, 2012, Available at: https://www.harlingen.tstc.edu/ctsd/documents/Getting_Started_with_Google_Apps_Guide.pdf.

"Supplementary Search Report Issued in European Patent Application No. 13821316.0", dated Jul. 6, 2016, 9 Pages.

Office Action and Search Report Issued in Taiwan Patent Application No. 102142290, dated Mar. 1, 2017, 9 Pages.

"First Office Action and Search Report Issued in Chinese Patent Application No. 2013800675481", dated Feb. 2, 2018, 13 Pages.

Hao, et al., "Internet Applied Technology", In Tianjin University Press, Aug. 31, 2011, 3 Pages.

"Second Office Action Issued in Chinese Patent Application No. 201380067548.1", dated Oct. 15, 2018, 11 Pages.

* cited by examiner

SUGGESTING RELATED ITEMS

BACKGROUND

Many people use electronic message programs to create, view and respond to electronic messages as well as schedule appointments and manage tasks. Users can access their electronic messages and appointments on desktop computers as well as on their mobile computing devices. When creating a message/appointment/task, a user manually enters the desired information. For example, a user enters each recipient of the message/appointment within an address field. It can be time consuming to enter this information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Recommendations, such as recipients and attachments, are determined from content that is associated with a message item (e.g. message/appointment/task). A user may enter one or more: recipients/attendees; attachments; and content for the message item that may be used in determining recommendations. Recommended recipients/attendees of the message item may be determined using different content that is associated with the message item. For example, the author of content (e.g. attachment/message), entered recipients/attendees, users an item is shared with, and the like may be used. Keywords may also be identified by analyzing the content of the message to determine recommended content/recipients. Behavior patterns may also be used to determine recommendations. For example, what users are typically included in a message, what topic is usually discussed among a group, what users are included in a meeting, what is the topic of a meeting between a group of users, and the like. The recommended users/content of a message item may be obtained from a messaging program, a local data store, a network data store, a cloud service, and the like. For example, recently viewed/accessed files, recently scheduled items, recent messages, and the like may be accessed at one or more locations. The recommended items (e.g. users/content) determined from analyzing the content are displayed such that they may be used by the user when editing the message item. The recommended items may be ranked by relevancy using metrics such as keywords, people, time last viewed and use patterns. For example, more relevant items may be items that are items that are more recently viewed, more related to a common keyword, and the like. The recommendations may be stored for later use in subsequent analysis recommendations. The analysis and index may be performed in the background.

DETAILED DESCRIPTION

Figure 1:
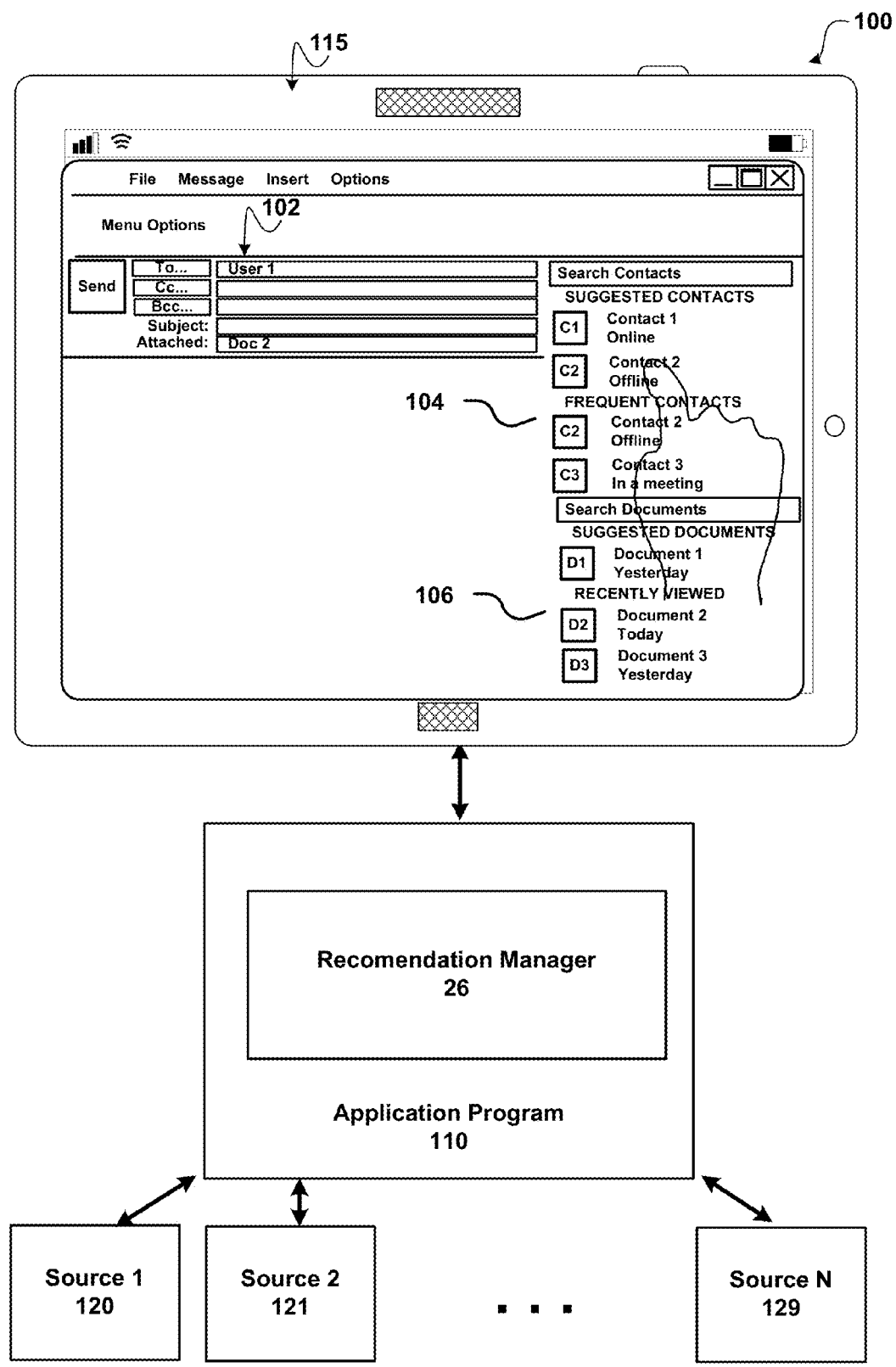
FIG. 1 shows a system for determining and recommending items to assist in content entry for a message item.

Referring now to the drawings, in which like numerals represent like elements, various embodiment will be described.

FIG. 1 shows a system for determining and recommending items to assist in content entry for a message item. As illustrated, system 100 includes application program 110, recommendation manager 26, data sources 1-N and touch screen input device/display 115.

In order to facilitate communication with the recommendation manager 26, one or more callback routines, may be implemented. According to one embodiment, application program 110 is a productivity application, such as an electronic messaging program such as MICROSOFT OUTLOOK, that is configured to receive input from a touch-sensitive input device 115 and/or other input devices. For example, voice input, keyboard input (e.g. a physical keyboard and/or SIP), video based input, and the like. Recommendation manager 26 may provide information to application 110 in response to a user's gesture selecting a user interface element, content and other touch based gestures. For example, gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 115 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Recommendation manager 26 is configured to determine and display recommendations (e.g. contacts, documents, . . . ) determined from content that is associated with composing an electronic message item (e.g. message/appointment/task). For example, a user may enter one or more: recipients/attendees; attachments; and content for the message item that may be used in determining recommendations. Recommended recipients/attendees of the message item may be determined using the different content that is associated with the message item. For example, the author of content (e.g. attachment/message), entered recipients/attendees, users an item is shared with, entered times/locations for an appointment, and the like may be used in determining recommendations. Keywords may also be identified by analyzing the content of the message item to determine recommended content/recipients for the message item. Behavior patterns may also be used to determine recommendations. For example, "what users are typically included in a message item", "what topic is usually discussed among a group identified by the message item", "what users are included in a meeting", "what is the topic of a meeting between a group of users", and the like. In the current example, a user has entered a recipient "User 1" and an attachment "Doc 2" in input area 102 of an electronic message. This content is used in determining recommended items 104 and 106.

The recommended items for a message item may be obtained using different data sources (e.g. sources 1-N). These sources may be programs (e.g. a messaging program that stores messages/appointments/contacts/tasks), data stores (e.g. a local data store, a network data store), cloud services (e.g. OFFICE 365), and the like. For example, the sources may be searched for messages, appointments, tasks, recently viewed/accessed files (e.g. within 60 number of days), recently scheduled items, recent messages, and the like may be accessed at one or more locations. According to an embodiment, an authorized user may configure settings such as sources to search, how many items to search, what type of items to search, what time frame to search (e.g. last 90 days, 60 days, 30 days, and the like).

Recommendation manager 26 determines the recommended items (e.g. contacts/documents) using the content with the message item (e.g. recipients, subject, attached documents, links, message content, and the like) by determining related items. Recommendation manager 26 displays the recommended items near a display of the message item composition item such that the user can select one or more of the recommended items to assist in composing the message item. For example, a user may select a contact (e.g. contact 2) that is displayed in the recommended contacts. In response to the selection, the message item is updated (e.g. a selected contact is added to the recipient list.").

Recommendation manager 26 uses different criteria to determine the recommended items. For example, use patterns, related contacts, keywords, sharing patterns, and the like may be used in determining the recommended items. More relevant items may be items that are items that are more recently viewed, more related to a common keyword, and the like. Recommendation manager 26 identifies users/contacts involved for each item/file associated with the message item by searching the author of the item and/or the sender and recipients involved when an item is shared. Recommendation manager 26 is also configured to determine past behavior patterns such as "what users are usually included in a message conversation," "what topic is usually discussed among a group of users", "who is usually involved in a meeting at a certain time", "what is a meeting between a particular group usually about?," "what the frequent contacts/recent documents of the author of the message item" and the like. Recommendation manager 26 may also be configured to identify keywords that are associate with the message item. For example, keywords may be extracted from the content of the message item, extracted from documents/images/links and the like.

Recommendation manager 26 may rank/arrange the recommended items by relevancy using metrics such as keywords, people, time last viewed and use patterns. According to an embodiment, a predetermined number (e.g. the top 10, 20, 30 items) are displayed in groups. In the current example, the recommended items for the message include a list of contacts and a list of documents. As shown, the contacts are split into suggested contacts (i.e. contacts determined to be possibly more relevant) and frequently used contacts. The documents are split into suggested documents and recently viewed documents.

The recommendations may be stored for later use in subsequent analysis recommendations. According to an embodiment, the analysis of the recommended items is updated in response to new content being added to the message item. For example, another recipient may be entered, a subject may be added, a meeting time may be added, a word/sentence may be added in the body of the message item, a document may be added, a link may be added, and the like. According to an embodiment, recommendation manager 26 performs the analysis in the background and stores the results for later use. More details are provided below.

Figure 2:
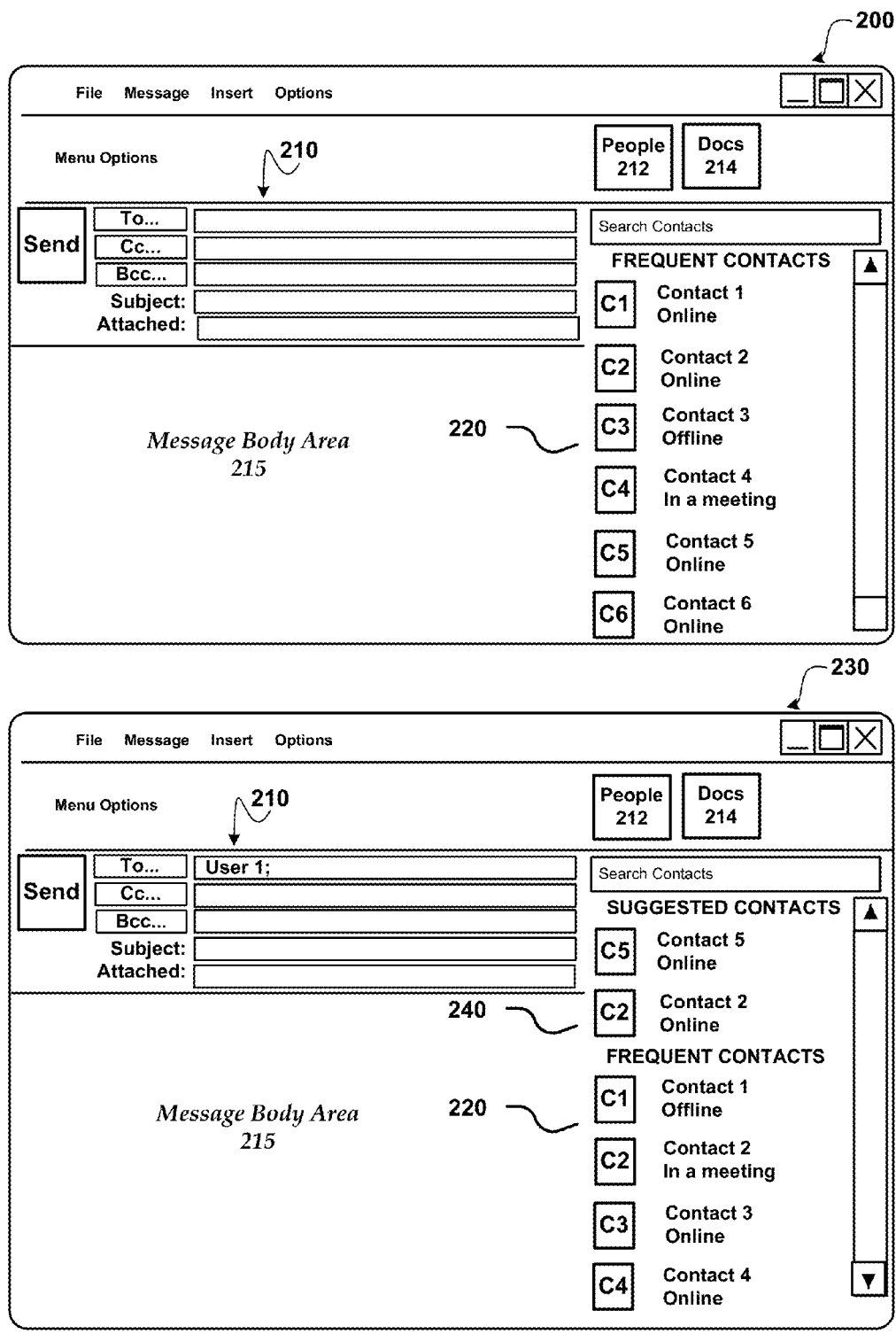
FIG. 2 shows an exemplary display of messages including recommendations of items based on content that is associated with an electronic message.

FIG. 2 shows an exemplary display of messages including recommendations of items based on content that is associated with an electronic message. FIG. 2 shows display 200 and display 230.

As illustrated, display 200 includes an initial display of a message when it is opened for composing. In the current example, message 200 includes an entry area 210 for entering recipients, a subject and attachments as well as message body area 215 for entering the message body. According to an embodiment, recommendation area 220 initially displays a list of frequent contacts associated with the sender of the message. Recommendation area 220 may be configured to initially display other recommended items. For example, recommendation area 220 may initially include recommended documents in addition to and/or in place of a list of contacts. As illustrated, display 200 and display 230 include User Interface (UI) elements 212 and 214 for turning on/off the display of recommended items. For example, people 212 UI element may be used to turn on/off the display of recommended contacts and docs 214 UI element may be used to turn on/off the display of recommended documents.

Display 230 shows the recommendation area 220 changed in response to a user entering a recipient "User 1" in input area 210. After an analysis using "User 1" as input, the recommended area 220 is updated to display suggested contacts 240. In the current example, contact 2 and contact 5 are displayed in recommended area 240 and are identified as recommended contacts based on the entry of "User 1."

Figure 3:
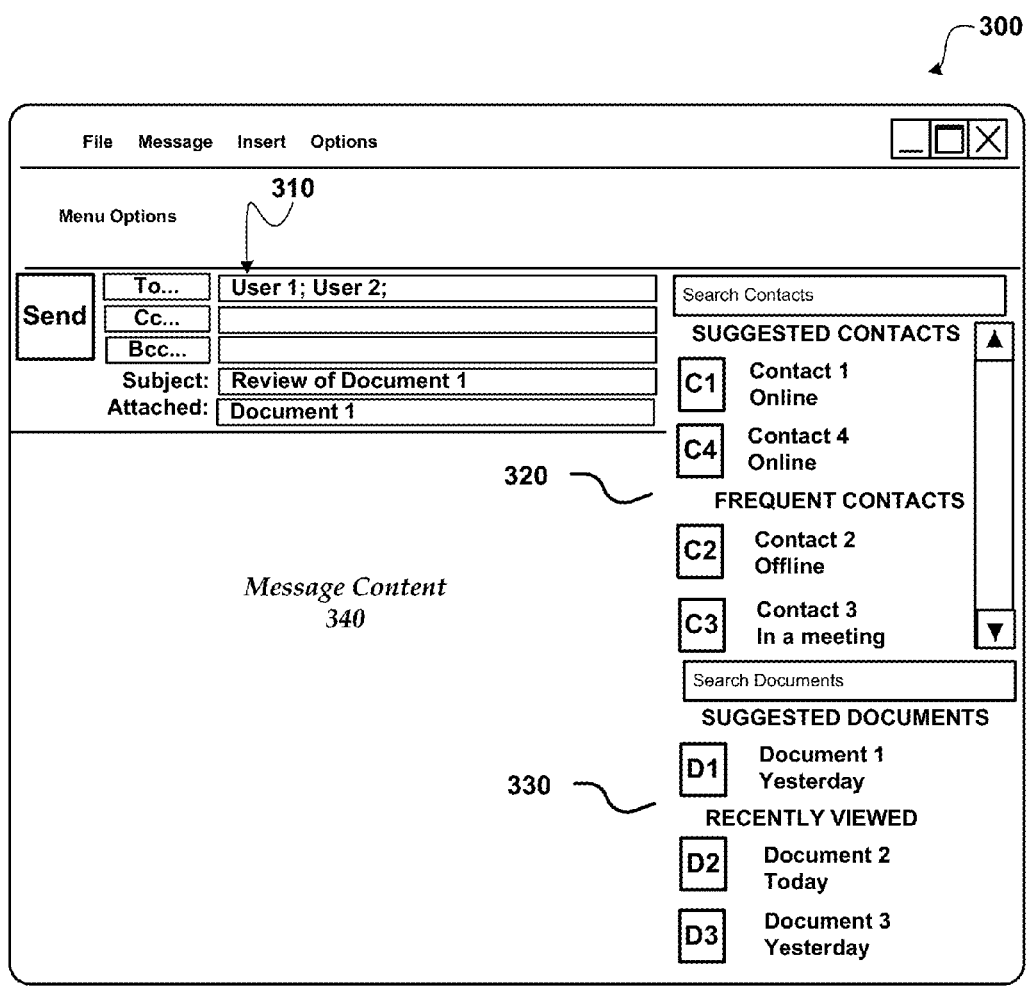
FIG. 3 shows an exemplary display of a message including recommendations of items based on entered content including recipients, subject and attachments.

FIG. 3 shows an exemplary display of a message including recommendations of items based on entered content including recipients, subject and attachments.

Display 300 shows an exemplary message with user entered content and displayed recommendations. In the current example, a user has entered two recipients "User 1" and "User 2", a subject "Review of Document 1" and an attachment "Document 1." As a user enters content, the recommended items are updated. Based on the user input, the recommended items include contacts (suggested and frequent) displayed in recommended area 320 and documents (suggested and recently viewed) displayed in recommended area 330. The documents may be any type of document that is viewed (e.g. word-processing document, electronic message, spreadsheet, calendar event, task, image, video, and the like). A user may select zero or more of the recommended items to assist in composing the message item.

Figure 4:
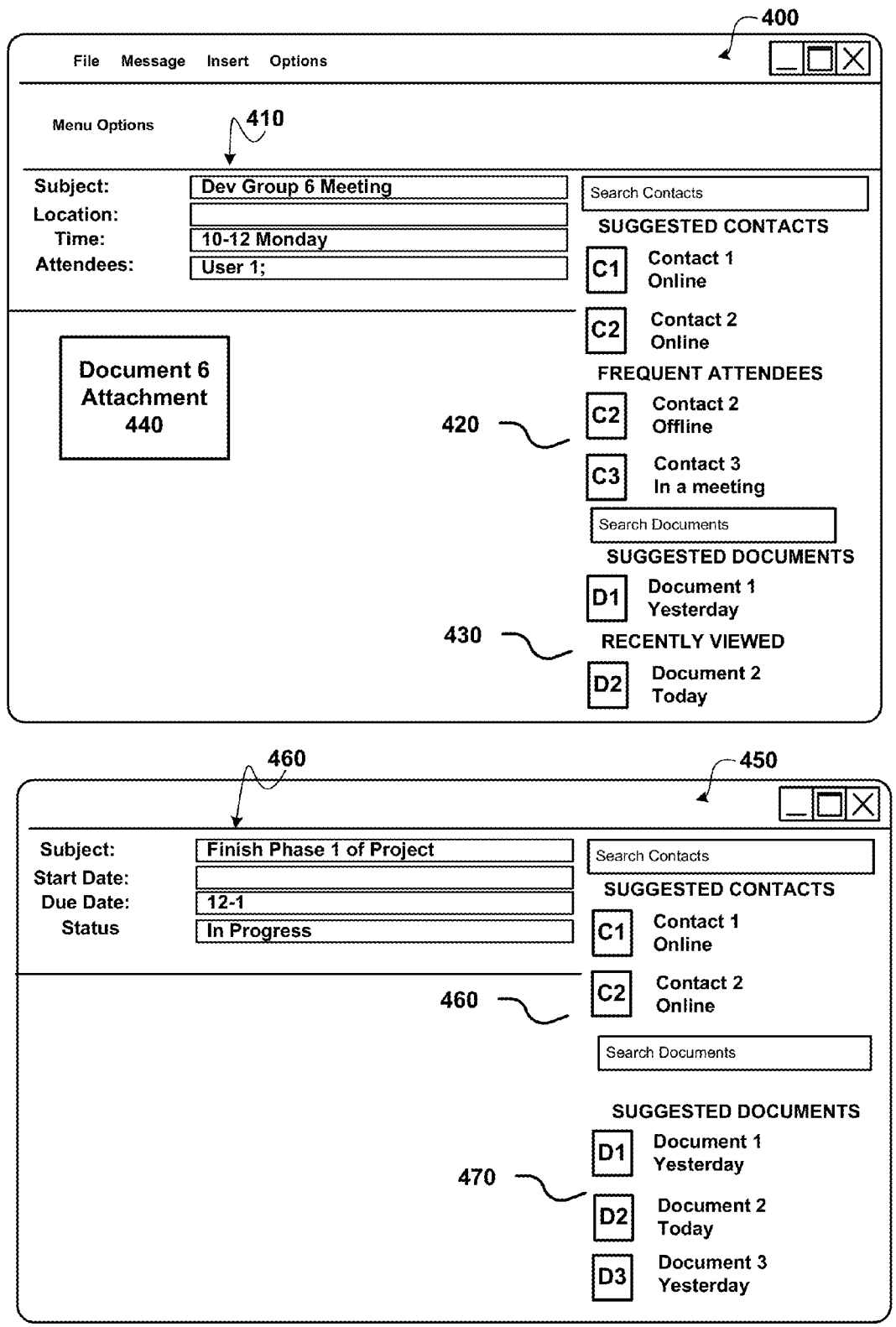
FIG. 4 shows an exemplary display of an appointment and task including recommendations of items based on entered content including recipients, subject and attachments.

FIG. 4 shows an exemplary display of an appointment and task including recommendations of items based on entered content including recipients, subject and attachments.

Display 400 shows an exemplary appointment with user entered content and displayed recommendations. In the current example, a subject "Dev Group 6 Meeting" a time for the meeting "10-12 on Monday", an attendee "User 1" and an attachment "Document 6." As a user enters content for the appointment, the recommended items are updated. Based on the user input, the recommended items include contacts (suggested and frequent) displayed in recommended area 420 and documents (suggested and recently viewed) displayed in recommended area 430. For example, the suggested contacts may be a part of Group 6 identified in the subject, a contact that usually participates in a meeting with the creator of the appointment from 10-12 and/or a contact generally in a meeting with User 1 from 10-12 and/or in Group 6. A user may select zero or more of the recommended items to assist in composing the message item.

Display 450 shows an exemplary task with user entered content and displayed recommendations. In the current example, a subject "Finish Phase 1 of Project" with a due date of "12-1" and a status of "In Progress." As a user enters content for the task, the recommended items are updated. Based on the user input, the recommended items include contacts displayed in recommended area 460 and documents displayed in recommended area 470. For example, the suggested contacts may be a part of Phase 1 of the project. A user may select zero or more of the recommended items to assist in composing the message item.

Figure 5:
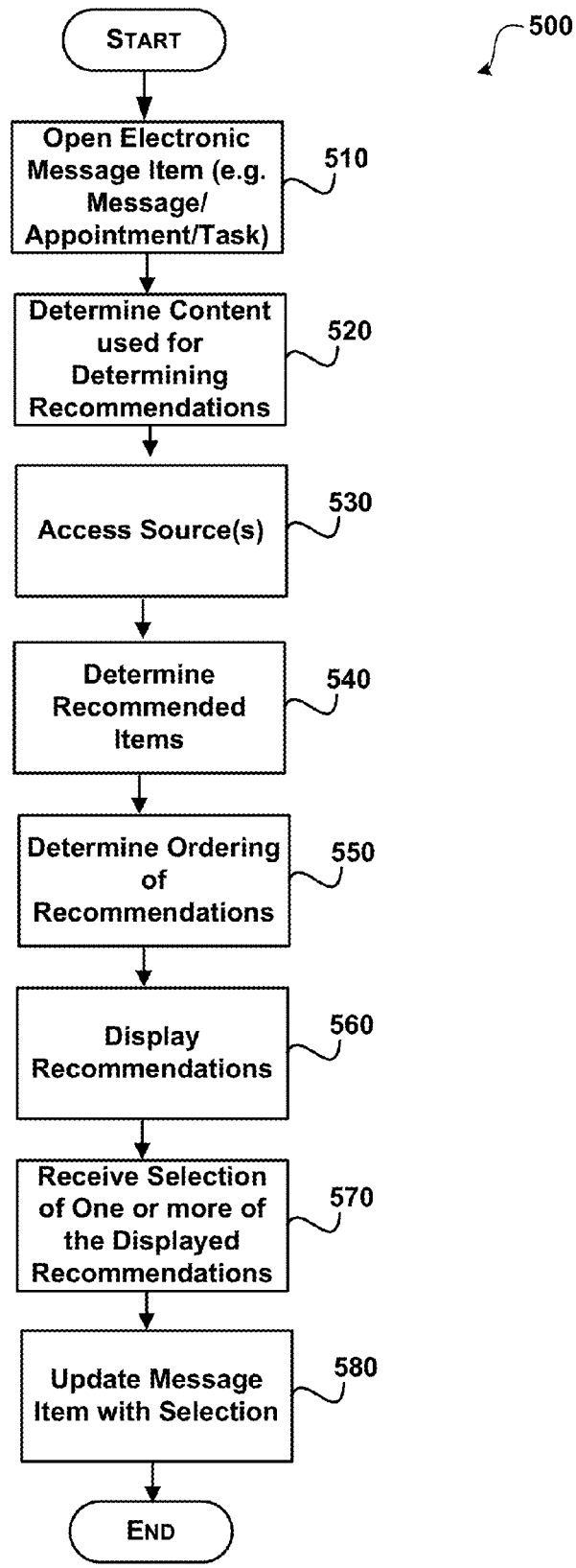
FIG. 5 shows an illustrative process for recommending items relating to composing a message item.

FIG. 5 shows an illustrative process 500 for recommending items relating to composing a message item. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process moves to operation 510, where a message item is accessed for composing. According to an embodiment, the message item is related to a messaging application and includes an electronic message, an electronic invitation (e.g. calendar task), and a task. For example, a user may open an electronic message to compose and send to one or more recipients. A user may also open up a new calendar event (e.g. meeting/appointment) and/or a task to compose. According to an embodiment, the messaging application is an application such as MICROSOFT OUTLOOK, GOOGLE MAIL, and the like. The messaging application may be a standalone messaging application, a network based application (e.g. cloud service/enterprise) and/or a combination of a local application and network based application. Other types of electronic messages may also be included (e.g. SMS, MMS, . . . ).

Flowing to operation 520, content associated with the message item is used for determining the recommended items is determined. For example, the content may be message content in the body of the message item, recipient(s) of the task, subject of the task, time of the task, location (e.g. of an appointment/meeting), attachment(s) to the task and the like. The content may already be included in the message item being composed (e.g. a draft was saved) and/or entered after opening the message item. For example, a user may enter a recipient of an electronic message and a subject for the message. According to an embodiment, an attachment as used herein includes attachments that are included with the delivery of the message item (e.g. message/invitation) as well as a link to the attachment and/or other content.

Moving to operation 530, the sources used to determine the recommended items for the message item are accessed. For example, the electronic sources may include a local storage associated with the user composing the message item, a network storage, the messaging application, and/or a cloud service(s).

Transitioning to operation 540, the recommended items are determined. The recommended items include items that are related to the message item. For example, the recommended items may be suggested recipients/attendees, frequent recipients/attendees, suggested documents, frequently accessed documents, meeting time(s), conference room(s), recent conference room(s) used, recent location(s), and the like. Recommended items may be updated throughout the process of composing the message item. For example, a user may open an electronic message and a list of potential recipients may initially be automatically displayed (e.g. based on recent message recipients). As the user adds recipients, the list of recipients may be modified (e.g. adding a recipient adds one or more suggested recipients out of the potential recipients). Similarly, when a user adds a document/link to the message item, the recipient list and/or suggested documents may be added. For example, a document that is added may be shared between four different users that may be indicated as suggested as well as other documents may be identified based on the content of the document and/or attributes of the document. A user may be scheduling a meeting and the recommended items may include suggested/recent meeting times, locations, and the like.

Flowing to operation 550, an ordering for the recommendations is determined. The recommended items may be ranked by relevancy. Metrics may be used to determine the relevancy of the recommendations including metrics such as: keywords, contacts (e.g. users/people) in common, time viewed (e.g. more recent to least recent), use patterns, keywords shared (more common to less common), and the like. For example, the closer in time a recommendation is viewed, the more relevant the recommendation. A relevancy score may be calculated for each recommendation and sorted based on the relevancy score. According to an embodiment, the top twenty most relevant are displayed. Different groups may be created for the recommended items. For example, suggested items, frequently occurring items, and the like. The recommendations may also be grouped/sorted based on the type of recommendation (e.g. users/documents/contacts, . . . ).

Moving to operation 560, the recommendations are displayed. The recommendations are displayed such that a user can select one or more of the displayed recommendations to assist in the composition of the message item.

Transitioning to operation 570, a selection of one or more of the recommended items is received. For example, a user may select a recipient from the recommended recipient list and/or a document and/or some other recommended item.

Moving to operation 580, the task is updated with the selection. For example, if a document is selected then it may be attached to the message item being composed. When a recipient is selected, the recipient is added to the message item (e.g. recipient/attendee).

The process then moves to an end operation and returns to processing other actions.

Figure 6:
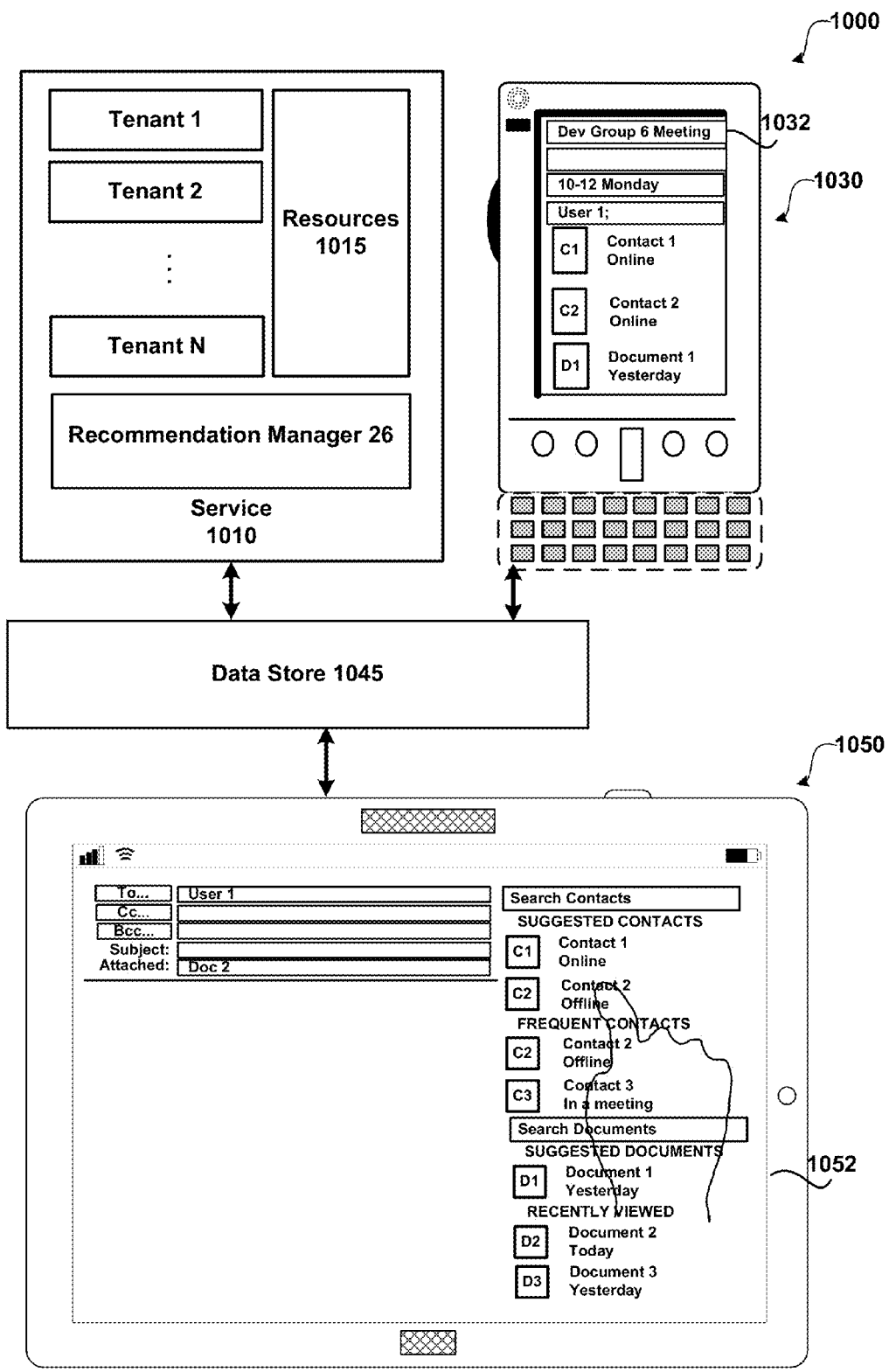
FIG. 6 illustrates an exemplary system for recommending items during the composition of a message item.

FIG. 6 illustrates an exemplary system for recommending items during the composition of a message item. As illustrated, system 1000 includes service 1010, data store 1045, touch screen input device/display 1050 (e.g. a slate) and smart phone 1030.

As illustrated, service 1010 is a cloud based and/or enterprise based service that may be configured to provide services, such as electronic messaging services (e.g. MICROSOFT EXCHANGE/OUTLOOK), productivity services (e.g. MICROSOFT OFFICE 365 or some other cloud based/online service that is used to interact with messages and content (e.g. spreadsheets, documents, presentations, charts, messages, and the like). The service may be interacted with using different types of input/output. For example, a user may use touch input, hardware based input, speech input, and the like. The service may provide speech output that combines pre-recorded speech and synthesized speech. Functionality of one or more of the services/applications provided by service 1010 may also be configured as a client/server based application. Although system 1000 shows a service relating to a messaging application, other services/applications may be configured.

As illustrated, service 1010 is a multi-tenant service that provides resources 1015 and services to any number of tenants (e.g. Tenants 1-N). Multi-tenant service 1010 is a cloud based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with messaging applications.

As illustrated, touch screen input device/display 1050 and smart phone 1030 shows exemplary displays 1052/1032 showing the use of an application and recommending items based on content. Display 1052 illustrates recommendations based on content of an electronic message. Display 1032 illustrates recommendations based on content for a calendar item. Data may be stored on a device (e.g. smart phone 1030, slate 1050 and/or at some other location (e.g. network data store 1045). The applications used by the devices may be client based applications, server based applications, cloud based applications and/or some combination.

Recommendation manager 26 is configured to perform operations relating to recommending items based on content as described herein. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
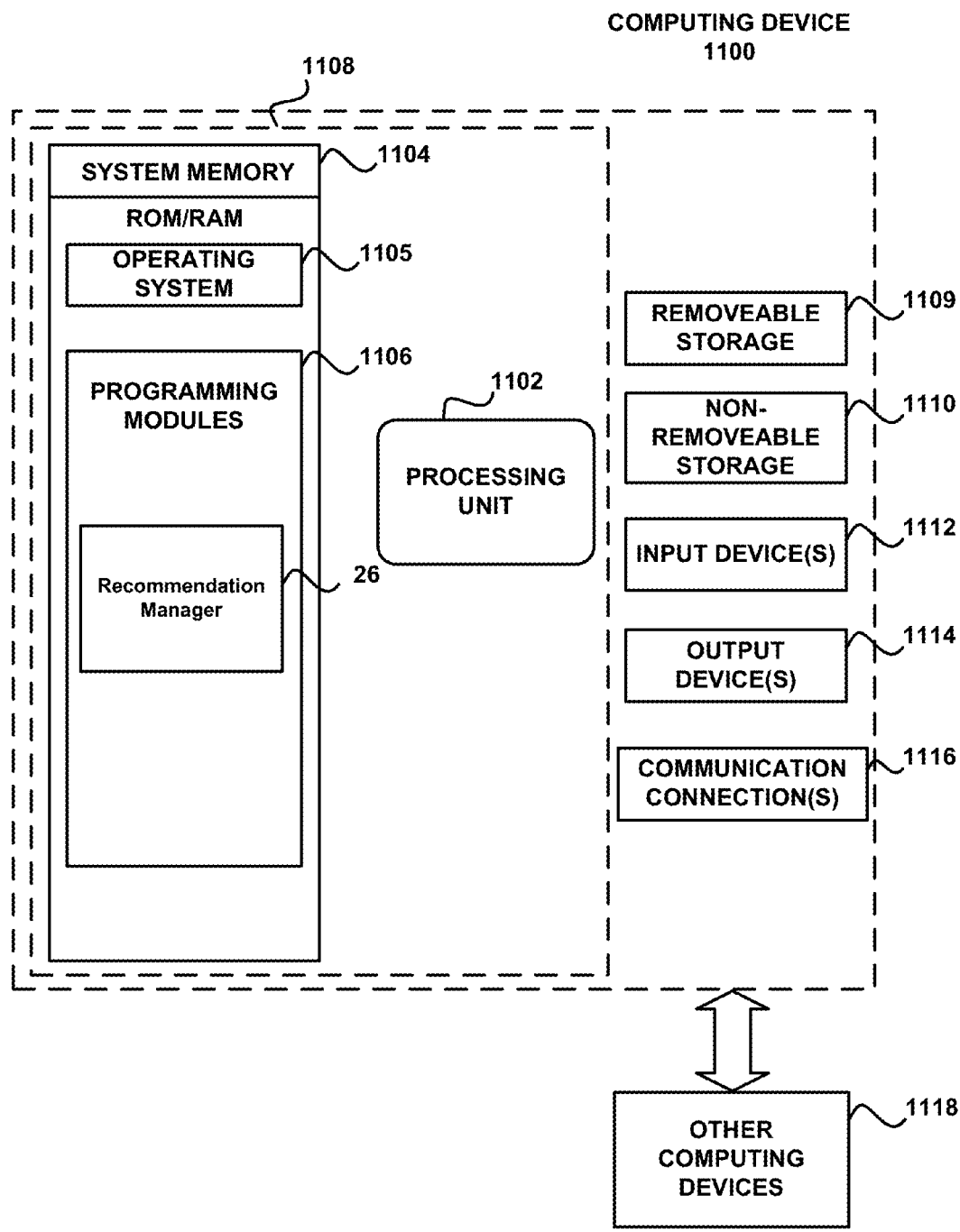
FIGS. 7-9 and the associated descriptions provide a discussion of a variety of operating environments in which embodiments of the invention may be practiced.
Figure 8A:
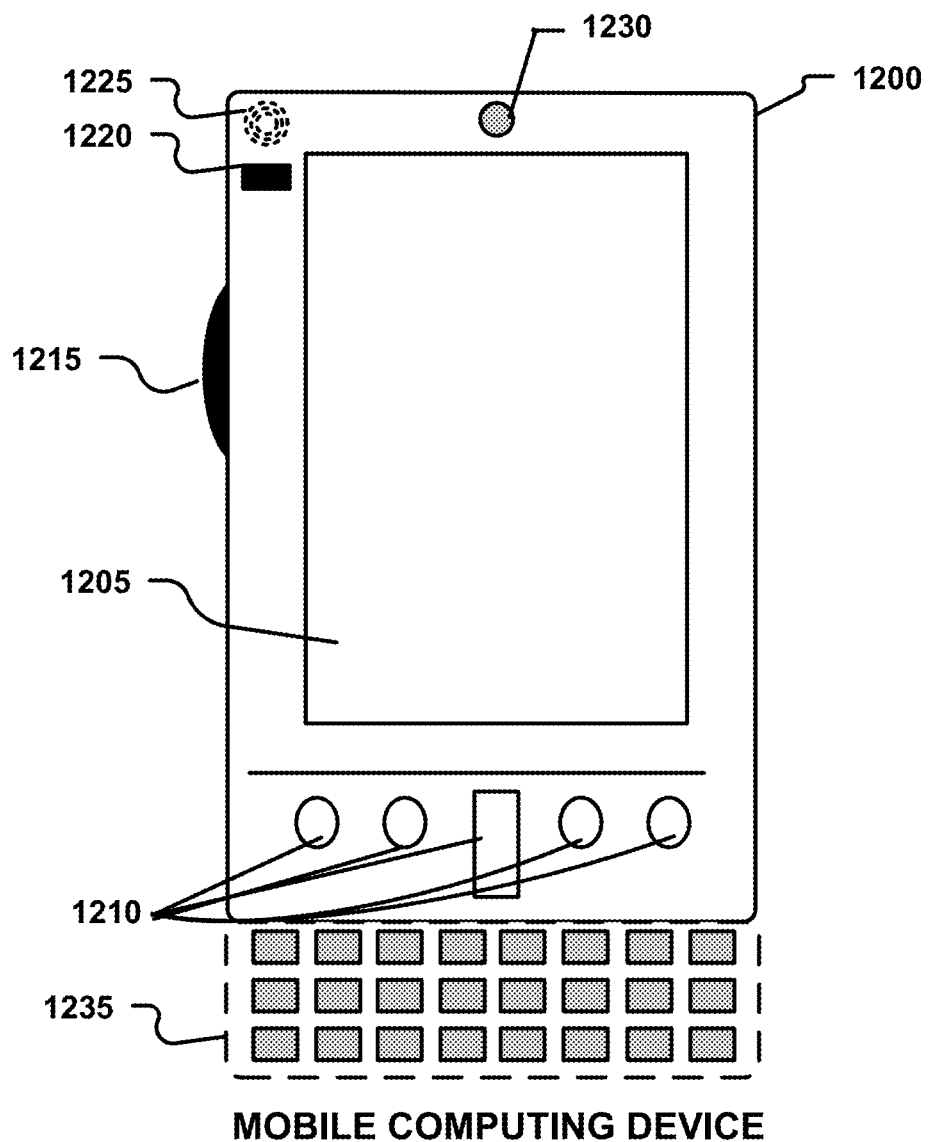
Figure 8B:
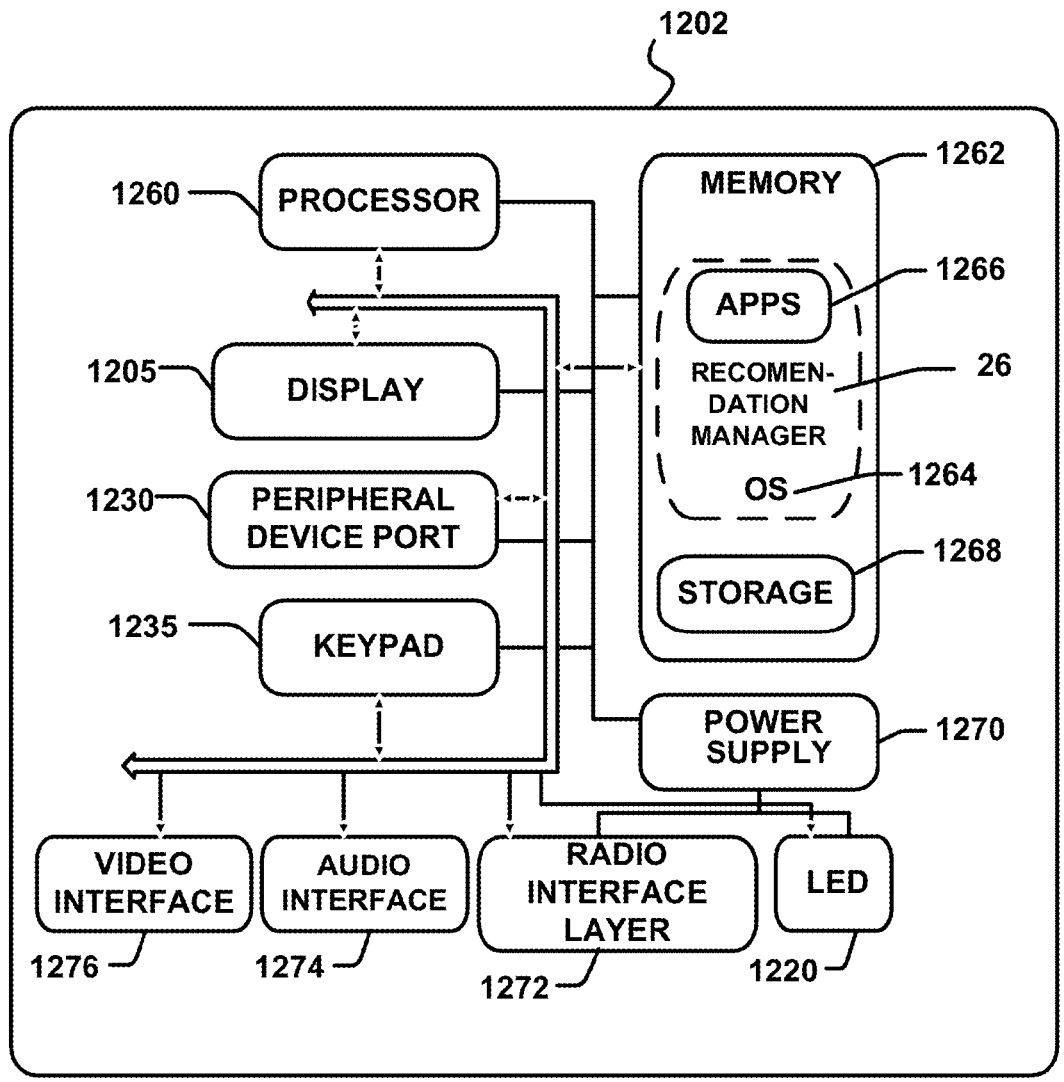
Figure 9:
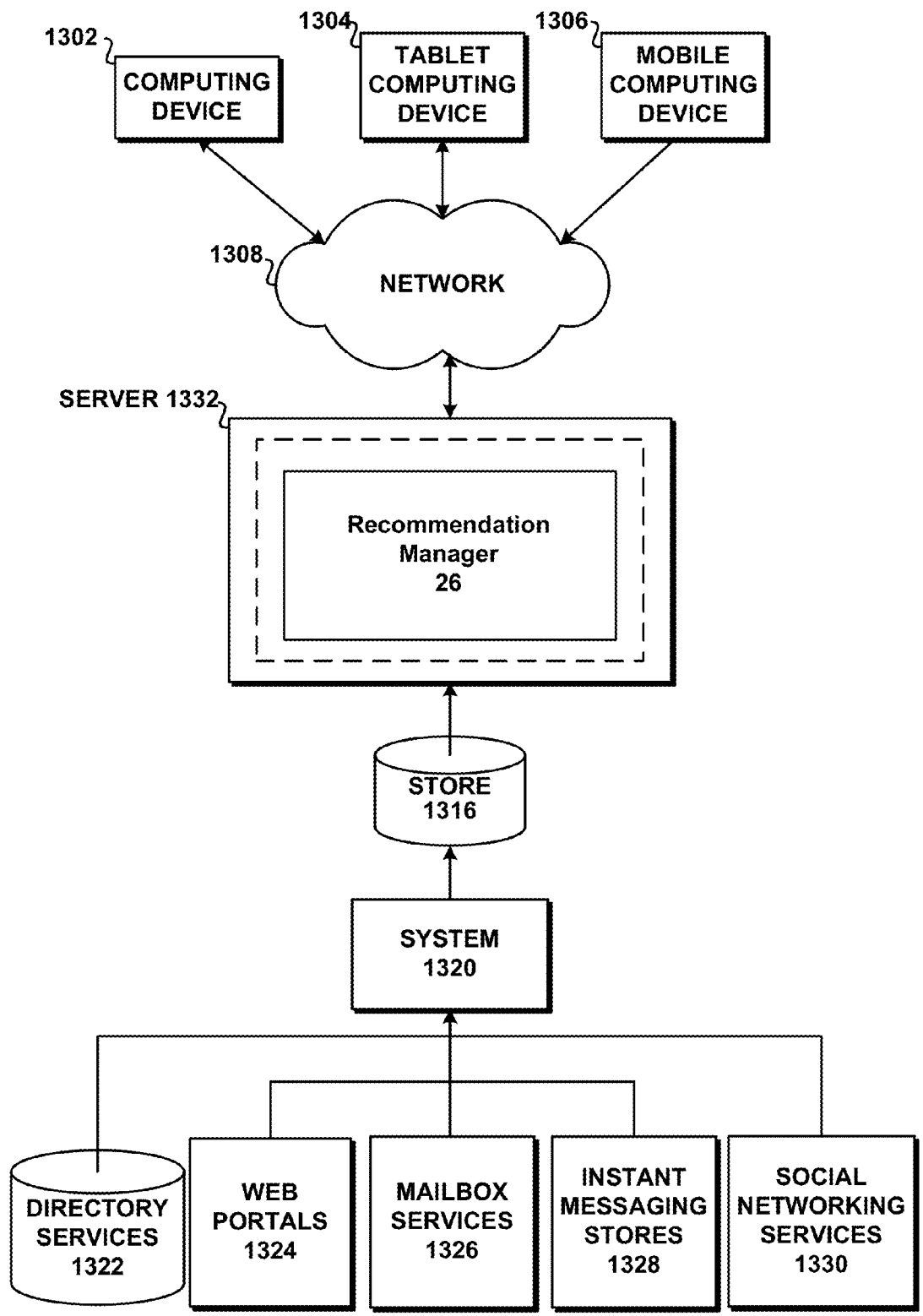

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a recommendation manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 7 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a suitable mobile computing environment, for example, a mobile telephone, a smartphone, a tablet personal computer, a laptop computer, and the like, with which embodiments of the invention may be practiced. With reference to FIG. 8A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 8B is a block diagram illustrating components of a mobile computing device used in one embodiment, such as the computing device shown in FIG. 8A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PDA) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the recommendation manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 8B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 9 illustrates a system architecture for recommending items used during composition of a message item.

Components managed via the recommendation manager 26 may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to recommending items. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for recommending items, comprising:
   accessing and displaying an electronic message that is displayed for composing by a user, wherein the blank electronic message includes a message recipient field, a subject field, a message content field;
   using a first user interface element to turn on/off a display of a list of selectable contacts, the selectable contacts usable to populate the message recipient field;
   using a second user interface element to turn on/off a display of a list of selectable message-attachable documents, the selectable message-attachable documents attachable to the electronic message;
   in response to turning on the display of the list of selectable contacts, displaying the list of selectable contacts that includes a list of frequent contacts based on an identity of the user;
   in response to selecting a first message recipient from the list of frequent contacts, updating the list of frequent contacts and additionally displaying within the list of selectable contacts a list of suggested contacts based on an identity of the user and an identity of the first message recipient;
   in response to turning on the display of the list of selectable documents, displaying the list of selectable documents including a list of frequently accessed documents based on an identity of the user; and
   in response to both turning on the display of the list of selectable documents and the blank electronic message having been populated with at least one message recipient, an entry in the subject field, an entry in the message content field or an attached document:
      determining content from one or more of the at least one message recipient, the entry in the subject field, the entry in the message content field or the attached document;
      displaying the list of the selectable documents including the list of frequently accessed documents based on the identity of the user and a list of suggested documents based on an identity of the user and the determined content; and
   in response to selection of a document from the list of suggested documents, updating the list of suggested documents.

2. The method of claim 1, wherein the first and second user interface elements comprise elements of the electronic message.

3. The method of claim 1, wherein the suggested contacts are additionally based on a group of contacts to which the user or the first message recipient belongs.

4. The method of claim 1, further comprising ranking the list of selectable documents based on relevancy.

5. The method of claim 4, wherein relevancy is based on a corresponding commonality of keywords in the content of the electronic message and a content of a message-attachable document.

6. The method of claim 4, wherein relevancy is based on an amount of time that a message-attachable document has been viewed.

7. A system for recommending items, comprising:
   a memory device storing executable instructions;
   a processor, which when executing the executable instructions is caused to:
      access and display an electronic message that is displayed for composing by a user, wherein the blank electronic message includes a message recipient field, a subject field, a message content field;
      use a first user interface element to turn on/off a display of a list of selectable contacts, the selectable contacts usable to populate the message recipient field;
      use a second user interface element to turn on/off a display of a list of selectable message-attachable documents, the selectable message-attachable documents attachable to the electronic message;
      in response to turning on the display of the list of selectable contacts, display the list of selectable contacts that includes a list of frequent contacts based on an identity of the user;
      in response to selection of a first message recipient from the list of frequent contacts, update the list of frequent contacts and additionally displaying within the list of selectable contacts a list of suggested contacts based on an identity of the user and an identity of the first message recipient;

in response to turning on the display of the list of selectable documents, display the list of selectable documents including a list of frequently accessed documents based on an identity of the user; and in response to both turning on the display of the list of selectable documents and the blank electronic message having been populated with at least one message recipient, an entry in the subject field, an entry in the message content field or an attached document:

determine content from one or more of the at least one message recipient, the entry in the subject field, the entry in the message content field or the attached document;

display the list of the selectable documents including the list of frequently accessed documents based on the identity of the user and a list of suggested documents based on an identity of the user and the determined content; and in response to selection of a document from the list of suggested documents, update the list of suggested documents.

8. The system of claim 7, wherein the first and second user interface elements comprise elements of the electronic message.

9. The system of claim 7, wherein the suggested contacts are additionally based on a group of contacts to which the user or the first message recipient belongs.

10. The system of claim 7, wherein the processor is further caused to rank the list of selectable documents based on relevancy.

11. The system of claim 10, wherein relevancy is based on a corresponding commonality of keywords in the content of the electronic message and a content of a message-attachable document.

12. The system of claim 10, wherein relevancy is based on an amount of time that a message-attachable document has been viewed.

13. A computer storage medium encoded with instructions, comprising:

accessing and displaying an electronic message that is displayed for composing by a user, wherein the blank electronic message includes a message recipient field, a subject field, a message content field;

using a first user interface element to turn on/off a display of a list of selectable contacts, the selectable contacts usable to populate the message recipient field;

using a second user interface element to turn on/off a display of a list of selectable message-attachable documents, the selectable message-attachable documents attachable to the electronic message;

in response to turning on the display of the list of selectable contacts, displaying the list of selectable contacts that includes a list of frequent contacts based on an identity of the user;

in response to selecting a first message recipient from the list of frequent contacts, updating the list of frequent contacts and additionally displaying within the list of selectable contacts a list of suggested contacts based on an identity of the user and an identity of the first message recipient;

in response to turning on the display of the list of selectable documents, displaying the list of selectable documents including a list of frequently accessed documents based on an identity of the user; and in response to both turning on the display of the list of selectable documents and the blank electronic message having been populated with at least one message recipient, an entry in the subject field, an entry in the message content field or an attached document:

determining content from one or more of the at least one message recipient, the entry in the subject field, the entry in the message content field or the attached document;

displaying the list of the selectable documents including the list of frequently accessed documents based on the identity of the user and a list of suggested documents based on an identity of the user and the determined content; and in response to selection of a document from the list of suggested documents, updating the list of suggested documents.

14. The computer storage medium of claim 13, wherein the first and second user interface elements comprise elements of the electronic message.

15. The computer storage medium of claim 13, wherein the suggested contacts are additionally based on a group of contacts to which the user or the first message recipient belongs.

16. The computer storage medium of claim 13, further comprising ranking the list of selectable documents based on relevancy.

17. The computer storage medium of claim 16, wherein relevancy is based on a corresponding commonality of keywords in the content of the electronic message and a content of a message-attachable document.

18. The computer storage medium of claim 16, wherein relevancy is based on an amount of time that a message-attachable document has been viewed.

* * * * *